(12) United States Patent
Carr et al.

(10) Patent No.: US 7,189,776 B2
(45) Date of Patent: Mar. 13, 2007

(54) AQUEOUS COMPOSITION

(75) Inventors: Duncan Carr, Neenah, WI (US);
Michael Sigman, Appleton, WI (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/167,355

(22) Filed: Jun. 11, 2002

(65) Prior Publication Data

US 2002/0198306 A1    Dec. 26, 2002

Related U.S. Application Data

(60) Provisional application No. 60/297,258, filed on Jun. 12, 2001.

(51) Int. Cl.
C08K 3/36 (2006.01)
C08K 9/02 (2006.01)
C08K 9/04 (2006.01)
C04B 24/26 (2006.01)

(52) U.S. Cl. .................. 524/493; 524/2; 524/492; 523/216

(58) Field of Classification Search .............. 524/492, 524/493, 494, 2; 523/216
See application file for complete search history.

(56) References Cited

U.S. PATENT DOCUMENTS

| | | | | |
|---|---|---|---|---|
| 4,388,150 A | | 6/1983 | Sunden et al. ........... 162/175 |
| 4,565,635 A | | 1/1986 | Le Du et al. .............. 210/727 |
| 4,643,801 A | * | 2/1987 | Johnson .................. 162/164.1 |
| 4,750,974 A | | 6/1988 | Johnson .................. 162/164.1 |
| 4,783,513 A | | 11/1988 | Cadel et al. ................ 526/216 |
| 4,840,705 A | * | 6/1989 | Ikeda et al. ................ 162/175 |
| 5,167,766 A | | 12/1992 | Honig et al. ............. 162/164.1 |
| 5,171,808 A | | 12/1992 | Ryles et al. ................ 526/264 |
| 5,176,891 A | | 1/1993 | Rushmere ................ 423/328.1 |
| 5,354,481 A | | 10/1994 | Neff et al. ................. 210/734 |
| 5,447,604 A | | 9/1995 | Johansson et al. ....... 162/181.6 |
| 5,482,693 A | | 1/1996 | Rushmere et al. ....... 423/328.1 |
| 5,603,805 A | | 2/1997 | Andersson et al. ...... 162/168.3 |
| 5,643,414 A | | 7/1997 | Johansson et al. ....... 162/164.6 |
| 5,700,893 A | | 12/1997 | Kuo et al. ................ 526/307.1 |
| 5,919,882 A | | 7/1999 | Ryles et al. ................ 526/306 |
| 5,958,188 A | | 9/1999 | Heard et al. .............. 162/168.2 |
| 5,961,840 A | * | 10/1999 | Ryles et al. ................ 210/734 |
| 6,063,240 A | | 5/2000 | Eriksson et al. ............ 162/162 |
| RE36,780 E | | 7/2000 | Kozakiewicz et al. ...... 210/734 |
| 6,083,997 A | | 7/2000 | Begala et al. ............... 516/79 |
| 6,113,741 A | * | 9/2000 | Kettunen et al. ........... 162/158 |
| 6,238,520 B1 | | 5/2001 | Greenwood ............. 162/164.1 |
| 6,379,500 B2 | | 4/2002 | Greenwood et al. ..... 162/181.6 |
| 6,395,134 B1 | | 5/2002 | Chen et al. ............. 162/168.1 |
| 6,406,593 B1 | | 6/2002 | Heard et al. ............. 162/168.1 |
| 6,454,902 B1 | | 9/2002 | Chen ....................... 162/168.1 |
| 6,524,439 B2 | | 2/2003 | Chen et al. ............. 162/168.1 |
| 6,616,806 B2 | | 9/2003 | I Chen .................... 162/168.1 |

FOREIGN PATENT DOCUMENTS

| | | |
|---|---|---|
| EP | 0 079 838 B1 | 5/1983 |
| EP | 0 502 089 B1 * | 6/1994 |
| EP | 0 877 120 B1 | 11/1998 |
| WO | WO 86/00100 | 1/1986 |
| WO | WO 94/05595 | 3/1994 |
| WO | WO 99/16708 | 4/1999 |
| WO | WO 00/66491 | 11/2000 |
| WO | WO 00/66492 | 11/2000 |
| WO | WO 01/46072 A1 | 6/2001 |

OTHER PUBLICATIONS

G. W. Sears, Jr., "Determination of Specific Surface Area of Colloidal Silica by Titration with Sodium Hydroxide," Analytical Chemistry, vol. 28, No. 12; 1956; pp. 1981-1983.
R. K. Iler et al., "Degree of Hydration of Particles of Colloidal Silica Aqueous Solution," Journal Phys. Chem., vol. 60; 1956; pp. 955-957.

* cited by examiner

*Primary Examiner*—Tae H. Yoon
(74) *Attorney, Agent, or Firm*—Lainie E. Parker; Michelle J. Burke

(57) ABSTRACT

The present invention relates to an aqueous composition comprising anionic organic polymeric particles and colloidal anionic silica-based particles. The anionic organic polymeric particles are obtainable by polymerising one or more ethylenically unsaturated monomers together with one or more polyfunctional branching agents and/or polyfunctional crosslinking agents. The anionic organic polymeric particles and the colloidal anionic silica-based particles in the aqueous composition are present in an amount of at least 0.01% by weight based on the total weight of the aqueous composition. The present invention further relates to a method for the preparation of the aqueous composition, uses of the aqueous composition and a process for the production or paper, in which the aqueous composition is added to a cellulosic suspension.

10 Claims, No Drawings

AQUEOUS COMPOSITION

This application claims the benefit of U.S. Provisional Patent Application No. 60/297,258, filed Jun. 12, 2001.

The present invention relates to an aqueous composition comprising anionic organic polymeric particles and colloidal anionic silica-based particles, a method for the preparation of the composition, uses of the composition and a process for the production or paper.

BACKGROUND OF THE INVENTION

In the papermaking art, an aqueous suspension containing cellulosic fibres, and optional fillers and additives, referred to as stock, is fed into a headbox which ejects the stock onto a forming wire. Water is drained from the stock through the forming wire so that a wet web of paper is formed on the wire, the paper web is further dewatered in the press section, and dried in the drying section of the paper machine. Drainage and retention aids are conventionally introduced into the stock in order to facilitate drainage and to increase adsorption of fine particles onto the cellulosic fibres so that they are retained with the fibres on the wire.

U.S. Pat. Nos. 4,750,974 and 4,643,801 discloses a coarcervate binder for use in a papermaking process. First cationic potato starch is added into the process, then an anionic mixture comprising anionic polymer and silica is added. The mixture contains 20:1 to 1:10 of anionic polymer to silica.

U.S. Pat. No. 6,083,997 discloses anionic nano-composites, which are prepared by adding a polyelectrolyte to silicate solution and then combining them with silicic acid. The nano-composites exhibit improved retention and drainage performance in papermaking processes.

U.S. Pat. No. 5,167,766 discloses a papermaking process in which an ionic organic polymer microbead is used together with a synthetic organic polymer or polysaccharide as retention and drainage aids It would be advantageous to be able to provide drainage and retention aids with improved performance. It would also be advantageous to be able to provide retention and drainage aids with good storage stability. It would further be advantageous to be able to provide a papermaking process with improved drainage and/or retention performance

SUMMARY OF THE INVENTION

In accordance with the present invention there is provided an aqueous composition comprising anionic organic polymeric particles and colloidal anionic silica-based particles. The anionic organic polymeric particles being obtainable by polymerising ethylenically unsaturated monomers together with a polyfunctional branching agent and/or a polyfunctional crosslinking agent and the amount of the anionic organic polymeric particles together with the colloidal anionic silica-based particles is at least 0.01% by weight based on the total weight of the aqueous composition.

Also, according to the present invention, there is provided a method for preparation of an aqueous composition. The method comprises mixing colloidal anionic silica-based particles with anionic organic polymeric particles obtainable by polymerising ethylenically unsaturated monomers together with a polyfunctional branching agent and/or a polyfunctional crosslinking agent, obtaining an amount of the colloidal anionic silica-based particles together with the anionic organic polymeric particles in the composition of at least 0.01% by weight based on the total weight of the aqueous composition.

There is further provided a process for production of paper from an aqueous suspension containing cellulosic fibres, and optional fillers. The process comprises adding to the fibre suspension a cationic polymer and an aqueous composition comprising anionic organic polymeric particles and colloidal anionic silica-based particles, the anionic organic polymeric particles being obtainable by polymerising ethylenically unsaturated monomers together with a polyfunctional branching agent and/or a polyfunctional crosslinking agent, the amount of anionic organic polymeric particles and colloidal anionic silica-based particles being at least 0.01% by weight based on the total weight of the aqueous composition.

There is also according to the present invention provided uses of an aqueous composition as flocculating agent, retention and drainage aids. There is further provided a paper obtainable by the process for the production of paper from an aqueous suspension containing cellulosic fibres.

DETAILED DESCRIPTION OF THE INVENTION

According to the present invention it has unexpectedly been found that improved drainage and/or retention effect in papermaking can be obtained by using colloidal anionic silica-based particles in combination with anionic organic polymeric particles.

The term "drainage and retention aid", as used herein, refers to one or more components, which when added to an aqueous cellulosic suspension, give better drainage and/or retention than is obtained when not adding any of said one or more components.

The aqueous composition according to the invention comprises anionic organic polymer particles and colloidal anionic silica-based particles. The anionic organic polymeric particles can be obtained by polymerising one or more anionic monomers and optionally one or more nonionic monomers capable of forming homopolymers or copolymers. The monomers forming the anionic organic polymeric particles can be formed from one or more anionic monomers such as anionic ethylenically unsaturated monomers selected from (meth)acrylic acids, 2-acrylamido-2-methylpropane sulfonate, sulfoethyl (meth)acrylate, vinylsulfonic acid, sulfoalkyl (meth)acrylic acids, sulfonated styrenes, unsaturated dicarboxylic acids, maleic or other dibasic acids, sulfoalkyl (meth)acrylamides, salts of said acids such as alkali or ammonium salts and mixtures thereof.

The anionic organic polymeric particles can be formed by copolymerising one or more of the above anionic monomers with one or more nonionic monomers such as (meth)acrylamides, N-alkylacrylamides such as N-methylacrylamide, N,N-dialkyl-acrylamides such as N,N-dimethylacrylamide, vinylacetate, alkyl (meth)acrylates such as methylacrylate, methylmethacrylate, acrylonitrile, N-vinylmethylacetamide, N-vinylmethylformamide, vinylacetate or N-vinyl pyrrolidone mixtures of any of the foregoing and the like. The ethylenically unsaturated nonionic monomers may be copolymerised as mentioned above to produce anionic copolymers, preferably acrylamide is copolymerised with an anionic monomer.

The particles may be formed from a branched and/or crosslinked anionic polymer of anionic monomers alone or copolymensed with nonionic monomers. The polymerisation of the particles can occur by using a polyfunctional branching agent and/or a polyfunctional crosslinking agent, optionally in the presence of a chain-transfer agent. Polymerisation of such monomers to form particles are known from U.S. Pat. Nos. 5,961,840, 5,919,882, 5,171,808 and 5,167,766.

Useful polyfunctional crosslinking or branching agents comprise compounds having either at least two ethylenically unsaturated bonds or at least one ethylenically unsaturated bond and at least one reactive group or at least two reactive groups Examples of suitable agents having at least two ethylenically unsaturated bonds include N,N-methylene-bis(meth)acrylamide, polyethyleneglycol di(meth)acrylate, N-vinylacrylamide, divinylbenzene, triallylammonium salts, N-methylallylacrylamide, and the like.

Examples of suitable agents having at least one ethylenically unsaturated bond and at least one reactive group include glycidyl(meth)acrylate, acrolein, methylolacrylamide and the like.

Examples of suitable branching or crosslinking agents having at least two reactive groups include dialdehydes such as glyoxal, epichlorohydrin, diepoxy compounds and the like Suitably a molecular weight modifying or chain-transfer agent is used in the polymerisation to control the structure of the polymer Suitable chain-transfer agents, which can be used to produce the particles include alcohols, mercaptans, thioacids, phosphites and sulphites, such as isopropyl alcohol and sodium hypophosphite, although many different chain-transfer agents may be employed The polymerisation process suitably comprises the steps of:

i) preparing a monomer emulsion by adding the monomers contained in aqueous phase to a hydrocarbon liquid containing a suitable surfactant or surfactant mixture;
ii) forming an inverse monomer emulsion of small aqueous droplets dispersed in an oil phase; and
iii) polymerising the monomers in the emulsion droplets by free radical polymerisation.

The aqueous phase contains anionic monomers and/or nonionic monomers together with branching and/or crosslinking agents. Preferably anionic organic polymeric particles have an unswollen average particle diameter size of less than about 750 nanometers, preferably less than 500 nm, more preferably from about 25 to about 300 nm.

The polyfunctional branching or crosslinking agents should preferably be used in sufficient quantities to induce sufficient branching of the polymeric product and/or sufficient crosslinks in the polymeric product. A suitable content of the polyfunctional branching and/or crosslinking agents can be at least 4 molar parts per million based on the monomeric units present in the polymer, preferred is a content of agents from about 4 to 6000 molar parts per million, more preferred about 20 to 4000, and most preferred about 50 to 2000 molar parts per million.

The anionic organic polymeric particles can contain from about 0 to about 99 parts by weight of nonionic monomers and from about 100 to about 1 parts by weight of anionic monomers based on the total weight of anionic and nonionic monomers, preferably from about 10 to about 90 parts by weight of nonionic monomers and from about 90 to about 10 parts by weight of anionic monomers, more preferably from about 20 to about 80 parts by weight of nonionic monomers and from about 80 to about 20 parts by weight of anionic monomers. The anionic organic polymeric particles having a charge of at least 2 meq/g, suitably at least within the rage of 2 to 18 meq/g, preferably within the range 3 to 15 meq/g, and more preferably within the range of 5 to 12 meq/g.

The aqueous composition according to the invention also comprises colloidal anionic silica-based particles, i.e. colloidal silica such as different types of polysilicic acid, silica particles, which are modified and contain other elements or compounds e.g. amine, aluminium and/or boron, which can be present in the aqueous phase and/or in the silica particles, and mixtures thereof. In the art, polysilicic acid is also referred to as polymeric silicic acid, polysilicic acid microgel, polysilicate and polysilicate microgel, which are all encompassed by the term polysilicic acid used herein. Aluminium-containing compounds of this type are commonly referred to as colloidal aluminium-modified silica including polyaluminosilicate and polyaluminosilicate microgel, which are encompassed by the term colloidal aluminium-modified silica, which is used herein. Preferred silica-based particles can be surface-modified with aluminium to a degree of from 2 to 25% substitutions of silicon atoms Suitable colloidal silica-based particles are disclosed in U.S. Pat. Nos. 5,643,414, 5,603,805 and 5,447,604, and in International Patent Applications WO 00/66491, WO 00/66492 and WO 01/46072. Mixtures of suitable silica-based particles can also be used.

It is preferred that the anionic silica-based particles are in the colloidal range of particle size. The average particle size of the anionic silica-based particles is suitably below about 50 nm, preferably below about 20 nm and more preferably in the range of from about 1 to about 10 nm. As conventional in silica chemistry, the particle size refers to the average size of the primary particles, which may be aggregated or non-aggregated The specific surface area of the silica-based particle is suitably larger than 50 $m^2/g$, and preferably larger than 100 $m^2/g$. The specific surface area can be up to 1700 $m^2/g$, and preferably up to 1000 $m^2/g$ The specific surface area of the silica-based particle is usually within the range from 300 to 1000 $m^2/g$, more preferably from 500 to 950 $m^2/g$.

The specific surface area can be measured by means of titration with NaOH as described by Sears in Analytical Chemistry 28(1956), 12, 1981–1983 and in U.S. Pat. No. 5,176,891. The given area thus represents the average specific surface area of the particles The ratio between the silica-based particles and the anionic organic polymeric particles solids in the aqueous composition can be from about 20:1 to about 1:50, usually from 15:1 to 1.40 preferably from about 10:1 to about 1:30, more preferably from about 5:1 to 1:20.

The amount of anionic particles (anionic organic polymeric particles and anionic silica-based particles) contained in the aqueous composition is at least 0 01% by weight calculated on the total amount of the aqueous composition, preferably 0 05% by weight, more preferably 0.1% by weight. The amount of anionic particles is suitably less than 45% by weight calculated on the total amount of the aqueous composition, preferably 35% by weight, and most preferably 30% by weight. Suitably the content of the anionic particles is within the range of 1 to 45% by weight, preferably within the range of 2 to 35% by weight, most preferably 5 to 30% by weight.

The aqueous composition has a charge of at least 0.5 meq/g, suitably the charge is within the range of 1 to 18 meq/g, preferably within the range of 2 to 15 meq/g, and more preferably within the range of 3 to 12 meq/g.

The aqueous composition of anionic silica-based particles with anionic organic polymeric particles is further successfully used as a flocculating agent in water treatment or in the treatment of wastewater and waste sludges, which render environmental benefits According to the present invention there is also provided a method for preparing the aqueous composition as defined above. The method comprises mixing colloidal anionic silica-based particles with anionic organic polymeric particles obtainable by polymerising ethylenically unsaturated monomers together with a polyfunctional branching agent and/or a polyfunctional crosslinking agent. Preferably the method comprises following steps:

(i) breaking the emulsion of the anionic organic polymeric particles to an inverse emulsion,
(ii) diluting the inverse emulsion of the anionic organic polymeric particles,
(iii) optionally diluting the solution of the anionic silica-based particles, and
(iv) mixing the anionic organic polymeric particles with the anionic silica-based particles, and
(v) optionally adding stabilisers to the aqueous composition.

Suitable anionic organic polymeric particles and colloidal anionic silica-based particles used in the method include those defined above. Preferably the silica-based particles are contained in a sol having an S-value usually in the range of from 5 to 60%, suitable from 8 to 50%, preferably from 12 to 45% and more preferably from 15 to 40% before mixing with the anionic organic polymeric particles as defined above. The S-value can be measured and calculated as described by Iler & Dalton in J. Phys. Chem. 60 (1956), 955–957. The S-value indicates the degree of aggregate or microgel formation and a lower S-value is indicative of a higher degree of aggregation. The sols containing silica-based particles can be modified with aluminium and/or boron as mentioned above.

The ratio between the silica-based particles and the anionic organic polymeric particles is defined above. Also the amount of anionic particles (anionic organic polymeric particles and anionic silica-based particles) contained in the aqueous composition is defined above.

The present invention relates to a process for the production of paper from an aqueous suspension containing cellulosic fibres, and optional fillers, which comprises adding to the suspension a cationic organic polymer and the above described aqueous composition containing anionic organic polymeric particles and colloidal anionic silica-based particles The cationic organic polymer according to the invention can be linear, branched or cross-linked. Preferably the cationic polymer is water-soluble or water-dispersible. Examples of suitable cationic polymers include synthetic organic polymers and cationic polysaccharides.

Examples of suitable cationic synthetic organic polymers include acrylate- and acrylamide-based polymers, as well as cationic poly(diallyl dimethyl ammonium chloride), cationic polyethylene imines, cationic polyamines, polyamidoamines and vinylamide-based polymers, melamine-formaldehyde and urea-formaldehyde resins.

Examples of suitable cationic polysaccharides include starches, guar gums, oelluloses, chitins, chitosans, glycans, galactans, glucans, xanthan gums, pectins, mannans, dextrins, preferably starches and guar gums. Examples of suitable cationic starches include potato, corn, wheat, tapioca, rice, waxy maize, barley, etc.

Cationic starches and cationic acrylamide-based polymers are preferred polymer components, and they can be used singly, together with each other or together with other polymers Suitable dosages counted as dry substance based on dry pulp and optional filler, of the cationic polymers in the system are 0.1–50 kg/t (kg/tonne. "metric ton") polysaccharide, preferably 0.1–30 kg/t and more preferably 1–10 kg/t; 0.01–15 kg/t synthetic organic polymer, preferably 0.01–10 kg/t and more preferably 0.1–2 kg/t.

Suitable dosages counted as dry substances based on dry pulp and optional filler, of the anionic aqueous composition defined above in the system are 0 01–15 kg/t, preferably 0.01–10 kg/t anionic organic particles, and more preferably 0 05–5 kg/t.

Suitable mineral fillers of conventional types may be added to the aqueous cellulosic suspension according to the invention. Examples of suitable fillers include kaolin, china clay, titanium dioxide, gypsum, talc and natural and synthetic calcium carbonates such as chalk, ground marble and precipitated calcium carbonate (PCC).

Further additives that are conventional in papermaking can of course be used in combination with the chemicals according to the invention, for example anionic trash catchers (ATC), wet strength agents, dry strength agents, optical brightening agents, dyes, aluminium compounds, etc. Examples of suitable aluminium compounds include alum, aluminates, aluminium chloride, aluminium nitrate and polyaluminium compounds, such as polyaluminium chlondes, polyaluminium sulphates, polyaluminium compounds containing chloride and/or sulphate ions, polyaluminium silicate sulphates, and mixtures thereof. The polyaluminium compounds may also contain other anions than chloride ions, for example anions from sulfuric acid, phosphoric acid, organic acids such as citric acid and oxalic acid. When employing an aluminium compound in the present process, it is usually preferably to add it to the stock prior to the polymer component and micro- or nanoparticulate material. Suitable amounts of aluminium containing compounds is at least 0.001 kg/t, preferably 0.01–5 kg/t and more preferably 0.05–1 kg/t, calculated as $Al_2O_3$ based on dry pulp and optional filler.

Examples of suitable anionic trash catchers include polyamines, polymers or copolymers of quaternary amines, or aluminum containing compounds.

Examples of suitable wet strength resins include polyamideamine-epichlorohydrin resin (PAAE), urea-formaldehyde resin (UF) and melamine-formaldehyde resin (MF) and glyoxal-polyacrylamide.

The process of this invention is used for the production of paper. The term "paper", as used herein, include not only paper and the production thereof, but also other web-like products, such as for example board and paperboard, and the production thereof. The invention is particularly useful in the manufacture of paper having grammages below 150 $g/m^2$, preferably below 100 $g/m^2$, for example fine paper, newspaper, light weight coated paper, super calendered paper and tissue.

The process can be used in the production of paper from all types of stocks, both wood containing and woodfree. The different types of suspensions of cellulose-containing fibres and the suspensions should suitably contain at least 25% by weight and preferably at least 50% of weight of such fibres, based on dry substance. The suspensions comprise fibres from chemical pulp such as sulphate, sulphite and organosolv pulps wood-containing or mechanical pulp such as thermomechanical pulp, chemo-thermomechanical pulp, refiner pulp and groundwood pulp, from both hardwood and softwood, and can also be based on recycled fibres, optionally from de-inked pulps, and mixtures thereof.

The chemicals according to the present invention can be added to the aqueous cellulosic suspension, or stock, in conventional manner and in any order It is usually preferably to add the cationic polymer to the stock before adding the anionic particles, even if the opposite order of addition may be used. It is further preferred to add the cationic polymer before a shear stage, which can be selected from pumping, mixing, cleaning, etc., and to add the anionic particles after that shear stage.

The invention is further illustrated in the following examples, which are not intended to limit the scope thereof. Parts and % relate to parts by weight and % by weight, respectively, and all solutions are aqueous, unless otherwise stated, the units are metric.

EXAMPLES

In these examples drainage and retention tests were done using wood containing and woodfree stocks. Aqueous compositions according to the invention were prepared from anionic organic polymeric particles (AOPP) and anionic silica-based particles, such as silica sols. The percentages are calculated as dry products throughout the examples unless specified.

The compounds used in the aqueous composition of the invention, or as references are:
AOPP. anionically charged polymer particles was Polyflex CP3® available from Ciba Special Chemicals with a molecular weight around 100,000 and a charge of 8.5 meq/g.
APAM anionic polyacrylamide with a molecular weight greater than 10 million and about 20% charge
Silica sol: ratio $SiO_2:Na_2O=45$, specific surface area=850 $m^2/g$ and S-value 20%.

The composition according to the invention was prepared by first diluting the AOPP component and stirring for 1 hour. After that diluted silica sol, which is stirred for 5 to 10 min at 500 rpm before it is added to the AOPP. The reference mixture of APAM and silica sol was prepared by the same procedure.

Example 1

In this example, measurements of fines retention were made using a Britt Dynamic Drainage Jar (DDJ) fitted with a vaned jar. A 200 mesh screen was employed for the retention testing and a rotor speed of 1000 rpm. The fines content is comprised of a combination of filler and wood derived fines.

Initially a total fines content determination was carried out by taking 100 ml of test stock and mixed with 400 ml of water and added to the jar with the rotor set at 1500 rpm. By removing the drain plug the fines were washed out and discarded and a further 500 ml of water added to the jar By repeating this process until the filtrate was clear the fines were completely removed. The long fiber fraction was then removed from the jar and collected on a filter paper and dried to determine the long fiber fraction. By measuring the stock consistency, the fines fraction consistency can be deduced and used as the basis to calculate the fines retention. The fraction of fines can also be expressed as a percentage of the total test stock consistency.

For the retention test itself 500 ml of well mixed stock was added to a cleaned DDJ and agitated at 1000 rpm. By using a timing sequence the chemicals were added as follows:

The stock was a wood containing stock made from mixing machine chest stock with whitewater taken from machine flume. The stock was based on 30% of mechanical pulp, 40% softwood Kraft and 30% broke. The pH was 7.6. The test stock fines were 69.9% and the test stock consistency 3.45 g/l. Cationic starch 2 5 kg/t, high molecular weight cationic polyacrylamide (CPAM) 0.37 kg/t and water-soluble AOPP 0.3 kg/t. With no chemicals present the clock was started and chemicals added via syringe to the agitated stock in the jar; cationic starch—after 15 seconds; CPAM—after 25 seconds, AOPP—after 30 seconds, and silica sol—after 35 seconds.

After 45 seconds the drain plug was removed and the first 100 ml of filtrate collected. The consistency of this filtrate was determined and a retention of fines was calculated using the known total consistency of fines in the original test stock.

To evaluate the performance of the composition according to the invention a composition comprising AOPP and silica sol was added after 30 seconds of stock mixing in the timing sequence with the cationic polymers added as above.

The performances of the aqueous composition of the invention and of the separate additions of AOPP and silica sol on retention of fines are summarised in Table 1.

TABLE 1

| Silica sol dosage kg/t | Silica sol + AOPP separate additions Retention of fines % | Silica sol + AOPP composition Retention of fines % |
| --- | --- | --- |
| 0 | 68.8 | 68.8 |
| 0.5 | 66.3 | 74.5 |
| 0.75 | 69.6 | 82.9 |
| 1.0 | 70.4 | 85.4 |

Example 2

The above Example was repeated with the exception that a woodfree stock was used. The stock was baseloaded with 10 kg/t of cornstarch and the pH was 7.8. The fines content was 47.4% and the stock consistency was 6.7 g/l. The stock was sampled from thin stock feeding the cleaners. The stock was based on 30% of softwood Kraft, 70% of hardwood Kraft, 10% of broke with 10% filler (PCC) Addition sequence: CPAM—AOPP—Anionic silica.

Both AOPP and Anionic Polyacrylamide (APAM) dosages were on a dry basis The clock was started and chemicals added via syringe to the agitated stock in a cleaned jar; cationic polyacrylamide after 25 seconds; anionic polymer after 30 seconds (AOPP or APAM); and anionic silica after 35 seconds.

The retention of fines was determined as previously for the wood containing stock after draining the first 100 ml of filtrate at 45 seconds. A composition of silica sol and AOPP or a mixture of silica sol and APAM were evaluated in these tests, the composition or the mixture was added after 30 seconds of stock mixing in the timing sequence.

The performance of the compositions comprising silica sol and AOPP or the mixture of silica sol and APAM compared to separate additions of the components together with 10 kg/t of starch and 0.25 kg/t CPAM (dry) are summarised in Table 2.

TABLE 2

| Sample | Fines Retention % |
|---|---|
| 0.3 kg/t AOPP; alone | 45 |
| 0.3 kg/t AOPP + 0.1 kg/t silica sol; separate additions | 53 |
| 0.3 kg/t AOPP + 0.1 kg/t silica sol; composition of the invention | 68 |
| 0.3 kg/t APAM; alone | 46 |
| 0.3 kg/t APAM + 0.1 kg/t silica sol; separate additions | 53 |
| 0.3 kg/t APAM + 0.1 kg/t silica sol; mixture | 56 |

Example 3

In this example the drainage measurements were made using Canadian Standard Freeness test. One liter of the diluted test stock was used with a target consistency of 3 g/l and agitated in the DDJ at 1000 rpm under identical conditions and timing sequences as with the fines retention determination above. The dilution was with tap water at room temperature At 45 seconds the stock was transferred to the freeness tester and the drainage test was conducted. The above mentioned stock was the wood containing stock.

The performance of the composition comprising AOPP and silica sol compared to separate additions of silica sol and AOPP on drainage are summarised in Table 3. The dosage of AOPP was the same in all tests and was 0.3 kg/t.

TABLE 3

| Silica sol dosage kg/t | Silica sol + AOPP separate additions Drainage CSF ml | Silica sol + AOPP composition Drainage CSF ml |
|---|---|---|
| 0 | 68 | 68 |
| 0.25 | 84 | 87 |
| 0.5 | 92 | 103 |
| 0.75 | 99 | 121 |
| 1.0 | 114 | 134 |

Example 4

Example 3 was repeated with the exception that the woodfree stock was used. The performance of the composition containing silica sol and AOPP on drainage time was compared to the performance of the mixture containing silica sol and APAM. The drainage times are summarised in Table 4. "Anionic Polymer" refers to either APAM or AOPP. The silica sol dosage was 0.2 kg/t.

TABLE 4

| Anionic polymer dosage kg/t (dry) | Silica sol + APAM reference mixture Drainage CSF ml | Silica sol + AOPP composition Drainage CSF ml |
|---|---|---|
| 0.25 | 166 | 250 |
| 0.3 | 160 | 276 |

The invention claimed is:

1. An aqueous composition comprising anionic organic polymeric particles and colloidal anionic silica-based particles having a specific surface area within the range of from 300 to 1000 $m^2/g$, the anionic organic polymeric particles being obtained by polymerising one or more ethylenically unsaturated monomers together with one or more polyfunctional branching agents and/or polyfunctional crosslinking agents, the anionic organic polymeric particles and the colloidal anionic silica-based particles being present in an amount of within the range of from 1 to 45% by weight based on the total weight of the aqueous composition, the colloidal anionic silica-based particles being silica, aluminium-modified silica or amine-modified silica and being contained in a sol having an S-value within the range from 5 to 60% before mixing with the anionic organic polymeric particles.

2. The aqueous composition according to claim 1, wherein the weight ratio of the colloidal anionic silica-based particles to the anionic organic polymeric particles ranges from 20:1 to 1:50.

3. The aqueous composition according to claim 1, wherein the weight ratio of the colloidal anionic silica-based particles to the anionic organic polymeric particles ranges from 5:1 to 1:20.

4. The aqueous composition according to claim 1, wherein the colloidal anionic silica-based particles are aluminium modified silica.

5. The aqueous composition according to claim 1, wherein the anionic organic polymeric particles comprise one or more monomers selected from the group consisting of (meth)acrylic acids, alkyl (meth)acrylic acids, sulfoalkyl (meth)acrylic acids, unsaturated dicarboxylic acids, sulfonated styrenes, sulfoalkyl (meth)acrylamides, acrylamides, N-alkyl acrylamides, N,N-dialkyl-acrylamides, methacrylamides, vinylacetate, acrylonitrile, N-vinyl methylacetamide and N-vinyl pyrrolidone, and salts of said acids.

6. The aqueous composition according to claim 1, wherein the polyfunctional branching agent and/or the polyfunctional crosslinking agent has at least two ethylenically unsaturated bonds.

7. The aqueous composition according to claim 1, wherein the colloidal anionic silica-based particles have a specific surface area within the range of from 500 to 950 $m^2/g$.

8. The aqueous composition according to claim 1, wherein the colloidal anionic silica-based particles have a particle size in the range of from 1 to 1 nm.

9. The aqueous composition according to claim 1, wherein the colloidal anionic silica-based particles are silica.

10. The aqueous composition according to claim 1, wherein the colloidal anionic silica-based particles are amine-modified silica.

* * * * *

UNITED STATES PATENT AND TRADEMARK OFFICE
CERTIFICATE OF CORRECTION

| | |
|---|---|
| PATENT NO. | : 7,189,776 B2 |
| APPLICATION NO. | : 10/167355 |
| DATED | : March 13, 2007 |
| INVENTOR(S) | : Carr et al. |

Page 1 of 1

It is certified that error appears in the above-identified patent and that said Letters Patent is hereby corrected as shown below:

<u>Claim 8, column 10, line 52</u>

"from 1 to 1 nm"     should read

--from 1 to 10 nm--

Signed and Sealed this

Twenty-sixth Day of February, 2008

JON W. DUDAS
*Director of the United States Patent and Trademark Office*